United States Patent
Baklycki

(10) Patent No.: US 11,939,083 B2
(45) Date of Patent: Mar. 26, 2024

(54) SELF-LEVELING LAUNCH AND RECOVERY PLATFORM FOR AERIAL VEHICLE AND METHOD OF MAINTAINING A LEVEL PLATFORM DURING LAUNCH AND RECOVERY

(71) Applicant: Michael A. Baklycki, Egg Harbor Township, NJ (US)

(72) Inventor: Michael A. Baklycki, Egg Harbor Township, NJ (US)

(*) Notice: Subject to any disclaimer, the term of this patent is extended or adjusted under 35 U.S.C. 154(b) by 28 days.

(21) Appl. No.: 17/494,741

(22) Filed: Oct. 5, 2021

(65) Prior Publication Data

US 2022/0024604 A1 Jan. 27, 2022

Related U.S. Application Data

(63) Continuation of application No. 16/402,679, filed on May 3, 2019, now Pat. No. 11,155,363.

(60) Provisional application No. 62/685,557, filed on Jun. 15, 2018.

(51) Int. Cl.
*B64F 1/36* (2017.01)

(52) U.S. Cl.
CPC ...................... *B64F 1/36* (2013.01)

(58) Field of Classification Search
CPC ...... B64F 1/36; B64F 1/00; B64F 1/10; B64F 1/007; B64C 2201/088; B64C 39/024; B62D 7/14; B62D 7/144; B60K 1/02; H02S 99/00

See application file for complete search history.

(56) References Cited

U.S. PATENT DOCUMENTS

| | | | | |
|---|---|---|---|---|
| 3,191,316 A | * | 6/1965 | Dryden | B64G 1/62 434/34 |
| 4,665,857 A | * | 5/1987 | Akerman | B63B 35/50 244/110 E |
| 6,079,668 A | * | 6/2000 | Brown | B64F 1/36 244/114 R |

(Continued)

FOREIGN PATENT DOCUMENTS

| | | | | |
|---|---|---|---|---|
| CN | 204623855 U | * | 9/2015 | |
| CN | 208092989 U | * | 11/2018 | |
| CN | 208507073 U | * | 2/2019 | G09B 25/00 |

OTHER PUBLICATIONS

English Translation CN204623855.*

*Primary Examiner* — Assres H Woldemaryam

(57) ABSTRACT

A self-leveling recovery platform for a landing operation of an unmanned aerial vehicle and a method for an unmanned aerial vehicle on a self-leveling recovery platform are described. The platform includes landing includes a base, a landing pad, first to sixth motors, first to sixth arms, an accelerometer, a gyroscope/inertial measurement unit, and a controller. The base is for fixedly mounting to a moving body. The landing pad has a landing surface on which an aerial vehicle can land. The first to sixth motors are attached to the base. The first to sixth arms control the first to sixth motors to the platform. The accelerometer and gyroscope/inertial measurement unit sense motion of the platform and output sensing signals. The controller is responsive to the sensing signals to control each of the motors to adjust the arms such that the landing surface is maintained in a substantially stable plane relative to a predetermined surface.

21 Claims, 3 Drawing Sheets

(56) References Cited

U.S. PATENT DOCUMENTS

| | | | | |
|---|---|---|---|---|
| 9,187,186 B2* | 11/2015 | Besenzoni | ................ | B64F 1/02 |
| 10,046,863 B2* | 8/2018 | Ying | ....................... | B64F 1/005 |
| 10,173,774 B2* | 1/2019 | Jones | .................. | B64C 39/024 |
| 10,343,794 B2* | 7/2019 | Conyers | .................. | B64F 1/007 |
| 2013/0202446 A1* | 8/2013 | Siegfriedsen | ........... | F03D 80/50 |
| | | | | 416/244 A |
| 2014/0124621 A1* | 5/2014 | Godzdanker | ........... | B64F 1/125 |
| | | | | 244/110 E |
| 2015/0367516 A1* | 12/2015 | Sarh | ....................... | B25J 9/1697 |
| | | | | 414/743 |
| 2016/0347475 A1* | 12/2016 | Garner | ................... | B64F 1/224 |
| 2017/0113079 A1* | 4/2017 | Thomsen | ............. | A62C 3/0292 |

* cited by examiner

SELF-LEVELING LAUNCH AND RECOVERY PLATFORM FOR AERIAL VEHICLE AND METHOD OF MAINTAINING A LEVEL PLATFORM DURING LAUNCH AND RECOVERY

This application is a continuation of U.S. application Ser. No. 16/402,679, filed May 3, 2019, which claims the benefit of U.S. Provisional Application No. 62/685,557, filed Jun. 15, 2018, the entireties of which are hereby incorporated herein by reference.

BACKGROUND OF THE INVENTION

Embodiments of the present invention relate generally to a landing platform for aircraft, and more particularly, to a self-leveling recovery platform suitable for an unmanned aerial vehicle (UAV) and a method of maintaining a level platform when landing an aerial vehicle.

Landing an Aircraft, such as an airplane or helicopter, poses unique challenges to the integrity of the aircraft as well as the safety of those involved in landing the aircraft, particularly when the aircraft is a UAV. A UAV, which may also be referred to as an autonomous vehicle or a drone, is an aircraft without a human pilot aboard. Instead of being piloted by an onboard human pilot, the UAV is controlled in a remote-control mode, an autonomous mode (e.g. by onboard computers) or in a partially autonomous mode. A UAV operating in a remote-control mode is typically controlled by a human operator who manually operates a remote-control. When the UAV operates in autonomous mode, the UAV typically moves based on pre-programmed navigation waypoints, dynamic automation systems, or a combination of these. UAVs are currently in use for applications that are too dangerous or messy for humans, but also in commercial, scientific, recreational, agricultural and other applications.

Aircraft, such as an UAV, are often landed on a platform. These platforms are sometimes attached to a static body, but can also be attached to a moving body such as another vehicle or a body of water. A typical landing platform attached to a moving body has a landing surface that moves with any movement of the moving body. Thus, the landing surface of a platform attached to a moving body does not stay level. A moving landing surface poses issues for any aircraft, and particularly for a UAV where control is performed remotely or autonomously. An aircraft attempting to land on a moving surface is particularly susceptible to damage, and any persons who may be present on or near the platform to assist in the landing process may be subjected to a heightened degree of danger.

BRIEF SUMMARY OF THE INVENTION

Embodiments of the present invention include a self-leveling recovery platform for an aerial vehicle. The self-leveling recovery platform is controlled by a controller that keeps the landing surface of the platform level while an aerial vehicle is attempting to land on the recovery platform. The self-leveling recovery platform is suitable for any aircraft, and is particularly suitable for a UAV in which control is performed remotely by a human operator or autonomously by onboard computers.

Embodiment of the present invention also include a method of maintaining a level platform during a landing operation of an aerial vehicle.

In one aspect, a self-leveling recovery platform for a landing operation of an unmanned aerial vehicle includes a base, a landing pad, first to sixth motors, first to sixth arms, an accelerometer, a gyroscope/inertial measurement unit, and a controller. The base is for fixedly mounting to a moving body. The landing pad has a landing surface on which an aerial vehicle can land. The first to sixth motors are attached to the base. The first to sixth arms control the first to sixth motors to the platform. The accelerometer and gyroscope/inertial measurement unit sense motion of the platform and output sensing signals. The controller is responsive to the sensing signals to control each of the motors to adjust the arms such that the landing surface is maintained in a substantially stable plane relative to a predetermined surface.

The accelerometer and the gyroscope/inertial measurement unit may be mounted to a bottom of the platform that is opposite to the landing surface.

The first to sixth motors may each comprise a shaft and a projection. The shaft is controlled by the controller to rotate in a clockwise and counterclockwise directions according to the accelerometer sensing signal and the gyroscope/inertial measurement unit signal. The projection extends from the shaft so as to rotate in the clockwise or counterclockwise direction as the shaft rotates in the clockwise or counterclockwise direction. A first end of one of the first to sixth arms is connected to the projection, and a second end of the one of the first to sixth arms is connected to the landing pad.

The landing pad may comprise comprises first to third connection pieces that are mounted to the bottom of the platform, and the second ends of two of the first to sixth arms of two adjacent motors may be connected to a same one connection piece of the first to third connection pieces.

The first to sixth motors may be first to sixth linear actuators each controlled by the controller such that each of the first to sixth arms extends from or retracts towards its corresponding first to sixth motor according to the accelerometer sensing signal and the gyroscope/inertial measurement unit signal.

The landing pad may comprise first to third connection pieces that are mounted to the bottom of the platform, and distal ends of two of the first to sixth arms of two adjacent motors are connected to a same one connection piece of the first to third connection pieces.

The first to sixth linear actuators may each be one of a pneumatic actuator, a hydraulic actuator and an electric actuator.

The landing pad may be foldable to reduce the footprint of the landing pad.

The landing pad may comprise an extension section that extends from a base portion of the platform to provide a runway for a UAV.

BRIEF DESCRIPTION OF THE FIGURES (NON-LIMITING EMBODIMENTS OF THE DISCLOSURE)

DETAILED DESCRIPTION

Figure 1:
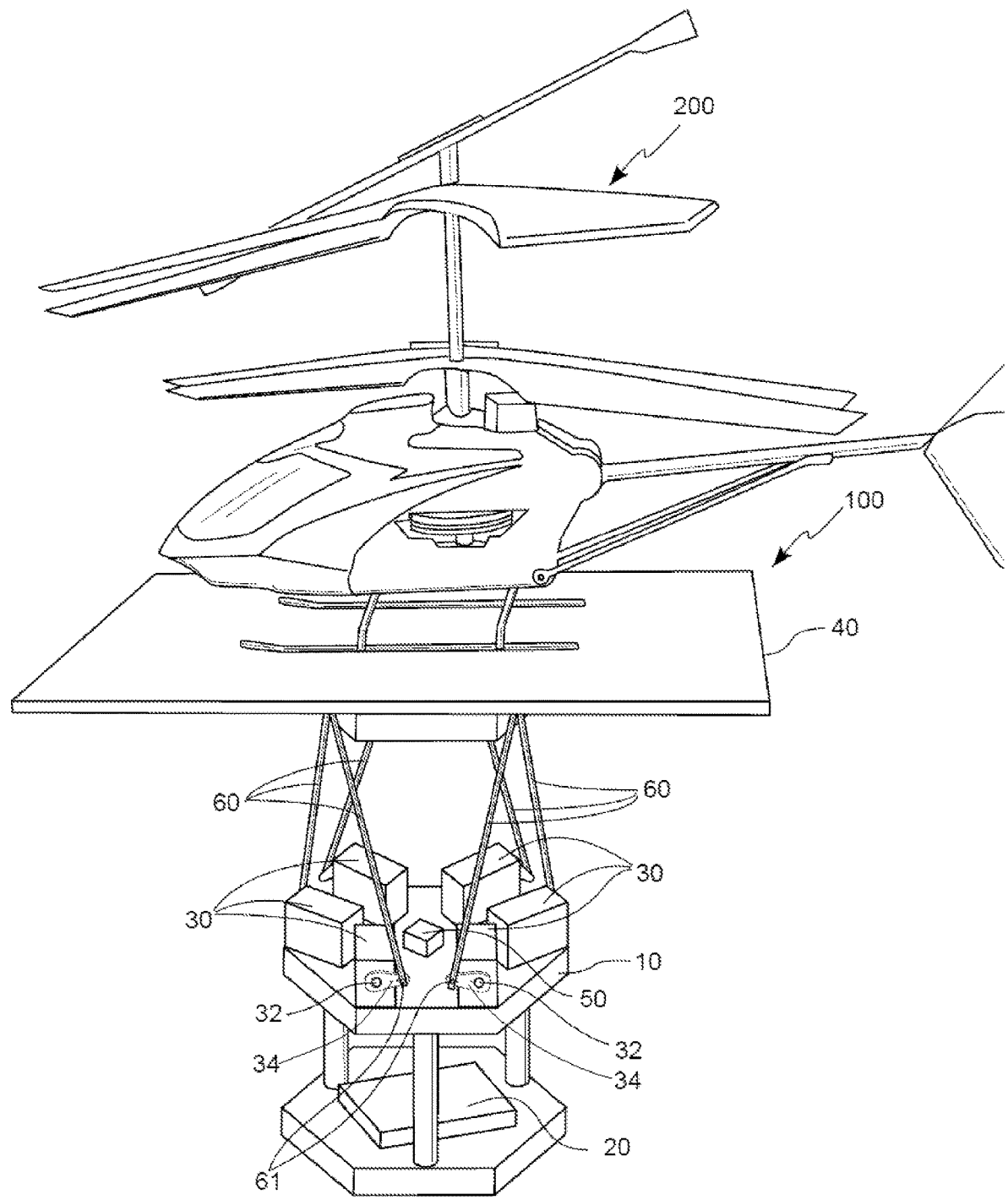
FIG. 1 shows a perspective view of a recovery platform according to an embodiment of the present invention.

Reference will now be made to the accompanying drawings, which form a part hereof, and which show, by way of illustration, specific exemplary embodiments. The principles described herein may, however, be embodied in many different forms. The components in the figures are not necessarily to scale, emphasis instead being placed upon illustrating the principles of the invention. Moreover, in the figures, like referenced numerals may be placed to designate corresponding parts throughout the different views.

In the following description of the invention, certain terminology is used for the purpose of reference only, and is not intended to be limiting. For example, although the terms first, second, etc. may be used herein to describe various elements, these elements should not be limited by these terms. These terms are only used to distinguish one element from another. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed terms. It will be further understood that the terms "comprises" and/or "comprising," when used in this specification, specify the presence of stated features, integers, steps, operations, elements, and/or components, but do not preclude the presence or addition of one or more other features, integers, steps operations, elements, components, and/or groups thereof.

Currently, unmanned aerial systems and vehicles (UAS/UAV) launch and recovery operations conducted on pitching, rolling ships or moving vehicles on uneven terrain are conducted with "timed landings"—waiting for the landing surface to become level—in order to prevent damage to the UAS/UAV. This wastes mission time, UAS fuel or battery power, and is a safety hazard to personnel.

Embodiments of the present invention include a recovery platform that provides for faster and safer UAS/UAV Operations, reduction of UAS fuel/power usage, prevention of damage to/loss of expensive UAS vehicles during launch/landing, and prevention of potential injury to personnel in close proximity to UAS operations. Embodiments of the landing platform can be utilized, for example, in supporting the transport via UAS/UAV of injured personnel from the field to the ship for medical treatment by operating from a stable platform not affected by ships pitch/roll. Similar utilization can be applied to land vehicles moving over uneven terrain (e.g., package delivery vehicles, police vehicles, fire department vehicles, etc.).

Embodiments of the present invention include a recovery platform that provides for horizontal and/or vertical launching and recovery of one UAV or multiple/swarms of UAVs, with the size of the UAV ranging anywhere from hand held to weighing up to several hundred pounds. The recovery platform provides a level landing surface despite being attached to a moving body such as the deck of a ship/marine vessel/marine platform, the surface of an ocean/lake/waterway/harbor or a moving land vehicle (fire truck, motorcade, police vehicle, shipping vehicle) by using a self-leveling UAS launch and recovery platform.

In an embodiment, the UAV launch and recovery platform is active (i.e., non-passive) in that it is a self-leveling system that is responsive to readings from sensors. In an embodiment, in order to provide for a 6 degrees of freedom, the device includes six motors (e.g., six prismatic actuators such as servo motors, linear actuators, or hydraulic actuators) attached in pairs to three positions on the platform's base (e.g., a baseplate), and which then cross over to three mounting points on a landing pad.

In an embodiment, the self-leveling platform receives sensory input via accelerometer and gyroscope/inertial measurement unit and maintains the UAV/UAS launch and recovery platform (i.e. takeoff and landing pad) in a stable horizontal plane relative to the earth's surface. The landing pad can be configured for vertical launch/landing UAS or horizontally launched/landing UAS. The landing pad can be a "smart" device communicating with UAS to enable autonomous launch and landing operations. The landing pad can be foldable or fixed in position.

Embodiments of the present invention provide a platform with one or more of the following advantages: two to 6 degrees of freedom; use of accelerometers and gyroscope in place of the inertial measurement unit; ability to counteract pitching and rolling of seas during shipboard UAS operations; ability to counteract the "bouncing around" of land based vehicles in motion during UAS operations; provide for autonomous landing of UAS on stationary or moving platforms (motor vehicles, marine vessels, etc.); provide for a configurable UAS/UAV landing surface that can be statically mounted or be configured as a folding landing surface; can be sized for hand held UAS up to UAS carrying human beings or heavy cargo.

FIG. 1 shows a perspective view of a recovery platform according to an embodiment of the present invention.

Referring to FIG. 1, the recovery platform 100 includes a base 10, a controller 20, a plurality of motors 30, a vertical launch and landing pad 40, and sensor 50.

The base 10 of the recovery platform 100 provides a stable base to which the components of the recovery platform 100 are mounted. The base 10 can in turn be mounted to a moving body such as a marine vessel, a body of water or a land vehicle. The base 10 may be a hexagonal, polygonal, or oval shape. However, the base 10 may be a different shape if the shape of the base 10 does not prevent the first to sixth motors 30 from being attached on the base 10.

The first to sixth motors 30 are mounted to the base 10 and are controlled by the controller 20. The first to sixth motors 30 may, for example, be prismatic actuators such as a servo motor or a linear actuator. In the event that the first to sixth motors 30 are linear actuators, they may, for example, be any one of a pneumatic actuator, a hydraulic actuator and an electric actuator. Each of the first to sixth motors 30 is driven by the controller 20 to move arms 60 towards or away from the landing pad 40 so as to move the landing pad 40 such that a landing surface of the landing pad 40 stays level despite movement of the moving body to which the platform 100 is attached.

In an embodiment, the first to sixth motors 30 are attached in associated pairs to the base 10. For example, in the embodiment shown in FIG. 1, the first and second motors 30 form a first pair, the third and fourth motors 30 form a second pair, and the fifth and sixth motors 30 form a third pair. The first pair is attached on the first side of the hexagonal base 10, the second pair is not on the right next side (second side) of the hexagonal base 10 but on the third side, the third pair is not on the fourth side but on fifth side. Thus, a side of the hexagonal base 10 right next to another side which include the motors 30 does not have any motors 30.

In the embodiment shown in FIG. 1, the first to sixth motors 30 are servo motors. Each of the servo motors includes a shaft 32 that that rotates clockwise and counterclockwise directions about an axis, and a projection 34 that projects from the shaft 32 and rotates with the shaft 32 in clockwise and counterclockwise directions. In the embodiment shown in FIG. 1, the proximal (or first) end of the arm 60 is attached to the projection 34. Thus, when the shaft 32 is rotated in a clockwise direction, the arm 60 is pulled downward, which in turn adjusts the angle of the landing pad 40 relative to the base 10. When the shaft 32 is rotated in a counterclockwise direction, the arm 60 is pushed upward, which in turn adjusts the angle of the landing pad 40 relative to the base 10. Each of the arms 60 is driven by its corresponding motor 30 such that the landing surface of the landing pad 40 is maintained in a substantially horizontal plane relative to the predetermined surface (e.g., the earth's surface).

The first to sixth motors 30 are attached on a plane of the hexagonal base 10. Each shaft 32 of the first to sixth motors 30 is disposed toward outside of the hexagonal base 10 at a right angle to a side of the base 10. This allows the projection 34 to freely move pivotably about the shaft 32. Two motors 30 are attached on the base 10 toward the same side of the base 10. Two sides of the base 10 right next to a side where two motors 30 are attached do not have any motors 30. Thus, each pair of the first to sixth motors 30 motors 30 are attached on each side of a hypothetical triangle.

In another embodiment of the present invention, the motors 30 may each be a linear actuator rather than a servo motor, and the linear actuator may, for example, be any one of a pneumatic actuator, a hydraulic actuator and an electric actuator. In this case, the arm 60 is attached to or inserted into its corresponding linear actuator. The arm 60 is then pushed or pulled by the linear actuator 60 in order to change the angle of the landing pad 40 in order to maintain the landing surface of the landing pad 40 in a substantially horizontal plane relative to the predetermined surface (e.g., the earth's surface).

Each of the arms 60 includes a proximal end 61 attached to the motor and a distal end 62 attached to the landing pad 40. The proximal end 61 of the arms 60 are pivotably connected to the projection 34 which is connected to the shaft 32. Projections 34 of the first and second motors 30 which are attached on one side of the hexagonal base 10 projects toward each other. Each distal end of the projections 34 of the first and second motors 30 from the shafts 32 are pivotably connected to the proximal end 61 of the arm 60. Similarly, projections 34 of the third and fourth motors 30 which are attached on another side of the hexagonal base 10 projects toward each other. Projections 34 of the fifth and sixth motors 30 which are attached on other side of the hexagonal base 10 projects toward each other. Each distal end of the projections 34 of the third and fourth motors 30 from the shafts 32 are pivotably connected to the proximal end 61 of the arm 60. Each distal end of the projections 34 of the fifth and sixth motors 30 from the shafts 32 are pivotably connected to the proximal end of the arm 60. Thus, when each motor 30 converts electrical energy into mechanical energy to rotate the shaft 32, the distal end of each projection 34 attached on the shaft 32 move upward or downward relative to the plane of the base 10. These projection's movement leads to the upward and or downward movement of the arm 60. The distal ends 62 of the arms 60 attached to the first pair (i.e., first and second) of motors 30 are attached to a first mounting point on the landing pad. The distal ends 62 of the arms 60 attached to the second pair (i.e., third and fourth) of motors 30 are attached to a second mounting point of the landing pad. The distal ends of the arms 60 attached to the third pair (i.e., fifth and sixth) of motors 30 are attached to a third mounting point of the landing pad 40. Thus, the platform 100 includes six motors 30 attached in pairs to three positions on the platform's base 10, and which then cross over (i.e., extend diagonally) to three mounting points on the landing pad 40. This particular arrangement in combination with the control provided by controller 20 allows for the landing surface of the landing pad 40 to be maintained in a stable substantially horizontal plane relative to a predetermined surface such as the earth's surface regardless of the movement of the base 10.

Figure 2:
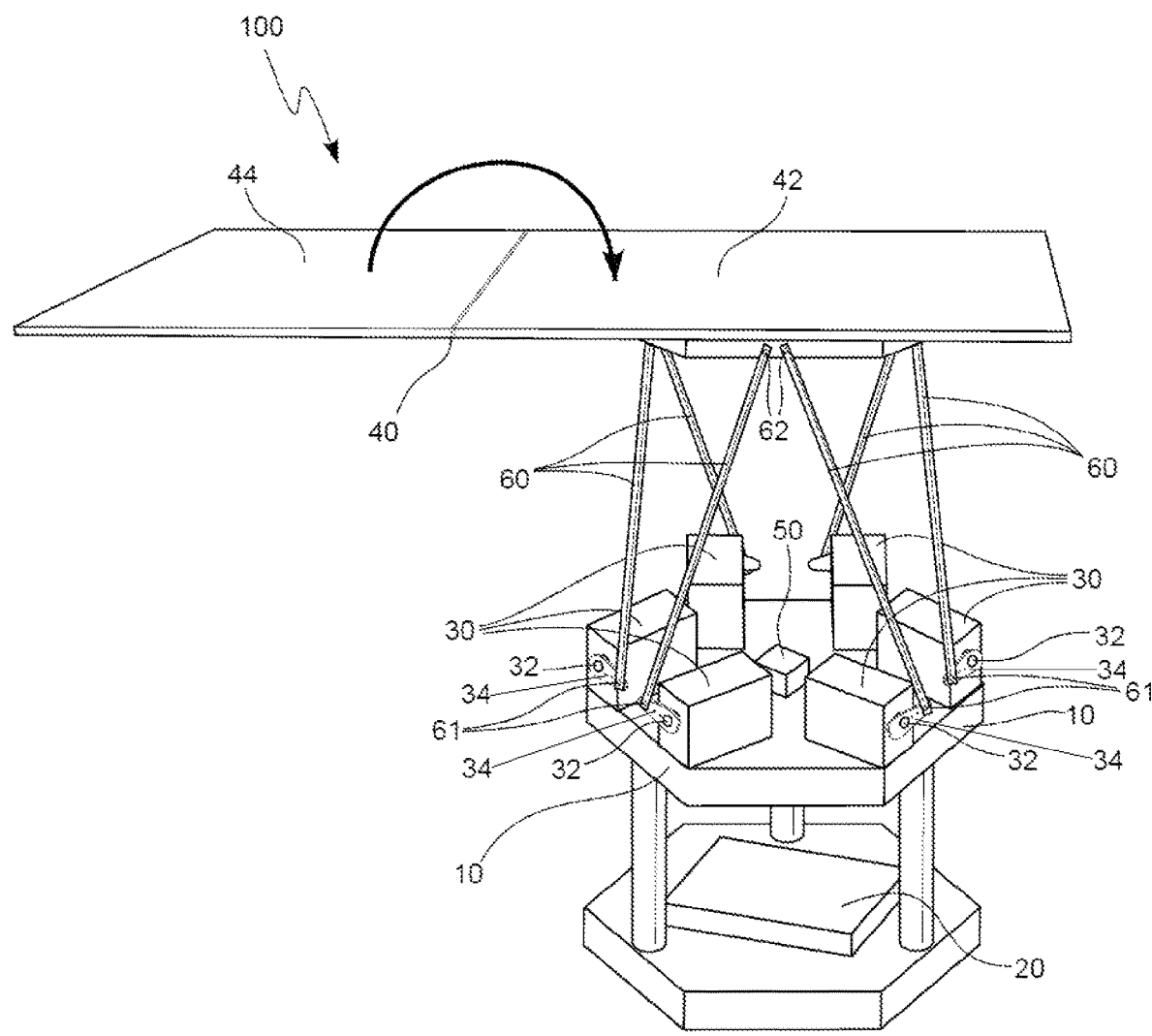
FIG. 2 shows a perspective view of a recovery platform when the extension section is extended according to an embodiment of the present invention.

The landing pad 40 of the platform 100 provides the landing surface on which the aerial vehicle 200 (e.g., the UAV) lands. The landing pad 40 may be foldable in order to minimize the footprint of the landing pad 40 when the platform 100 is not in use (e.g., there are no scheduled landings). In addition, in the embodiment shown in FIG. 2, the landing pad 40 may include a base portion 42 and an extension section 44. The extension section may fold over or slide into the base section so that the landing pad 40 is extendible. The extendible landing pad 40 can then be used in both a compact position in which the extension section 44 folded or extended into the base section 42, and an extended position in which the extension section 44 is folded out or extended away from the base section 42.

When the extension section 44 can then provide for a runway in the event that additional space is necessary for landing the aircraft.

The controller 20 receives signals from a sensor 50. The sensor 50 may include both an accelerometer and a gyroscope/inertial measurement unit. In an embodiment, the accelerometer and a gyroscope/inertial measurement unit may be mounted to the bottom of the landing pad 40 or on an upper surface of the base 10 where the six motors 30 are mounted. This layout is preferable, as it provides the most accurate measurements and a minimal travel distance for the signals transferred from the sensor 50 to the controller 20. However, it should be understood that the invention is not limited to the sensors 50 being mounted to the bottom of the landing pad 40 or on the upper surface of the base 10. For example, the sensors may positioned elsewhere on the recovery platform 100, or may even be placed elsewhere on the moving body to which the recovery platform 100 is mounted. For example, in the case in which the recovery platform 100 is mounted to the deck of a ship/marine vessel/marine platform, the sensors 50 may be placed on the ship/marine vessel/marine platform itself rather than on the recovery platform 100.

The controller 20 controls each motor 30 based on signals from the sensor 50 for the landing pad 40 to stay level to the earth's surface. For example, if a point of the base 10 where the first and second motors 30 are disposed moves downward, the controller 20 detects the downward movement of the base 10 based on the signals from the sensor 50. The controller 20 controls the first and second motors 30 to move the projections 34 attached to the first and second motors 30 upward. Then, the arms 60 pivotably connected to the projections 34 move upward based on the upward movement of the projections 34. Thus, the depth in which the base 10 moves downward is compensated by the upward movement of the arms 60, and the launching pad 40 stays level to the earth's surface. Similarly, if a point of the base 10 where the first and second motors 30 are disposed moves upward, the controller 20 detects the upward movement of the base 10 based on the signals from the sensor 50. The controller 20 controls the first and second motors 30 to move the projections 34 attached to the first and second motors 30 downward. Then, the arms 60 pivotably connected to the projections 34 move downward based on the downward movement of the projections 34. Thus, the depth in which the base 10 moves upward is compensated by the downward movement of the arms 60, and the landing pad 40 stays level to the earth's surface.

The sensor 50 detects motion/movement in the six degrees of freedom that moving body 200 to which it is attached (e.g., a ship, boat, marine platform, etc.) can experience. Thus the sensor 50 can detect motion in the vertical/Z axis (e.g., a yaw or side-to side movement), the lateral/Y axis (e.g., a pitch or up-or-down movement) and the longitudinal/X axis (e.g., a roll or side-to-side or port-starboard tilting motion). The sensor 50 sends signals representing these motions to the controller 20. In response to the signals sent by the sensor 50, the controller 20 controls the first to sixth motors 30 to drive the arms 60 in order to counter balance movement in the vertical, lateral and longitudinal axis. In this way, the controller 20 controls the motors 60 to adjust the landing pad 40 so that the landing surface of the landing pad 40 maintains a stable substantially horizontal plane relative to a predetermined surface.

Figure 3:
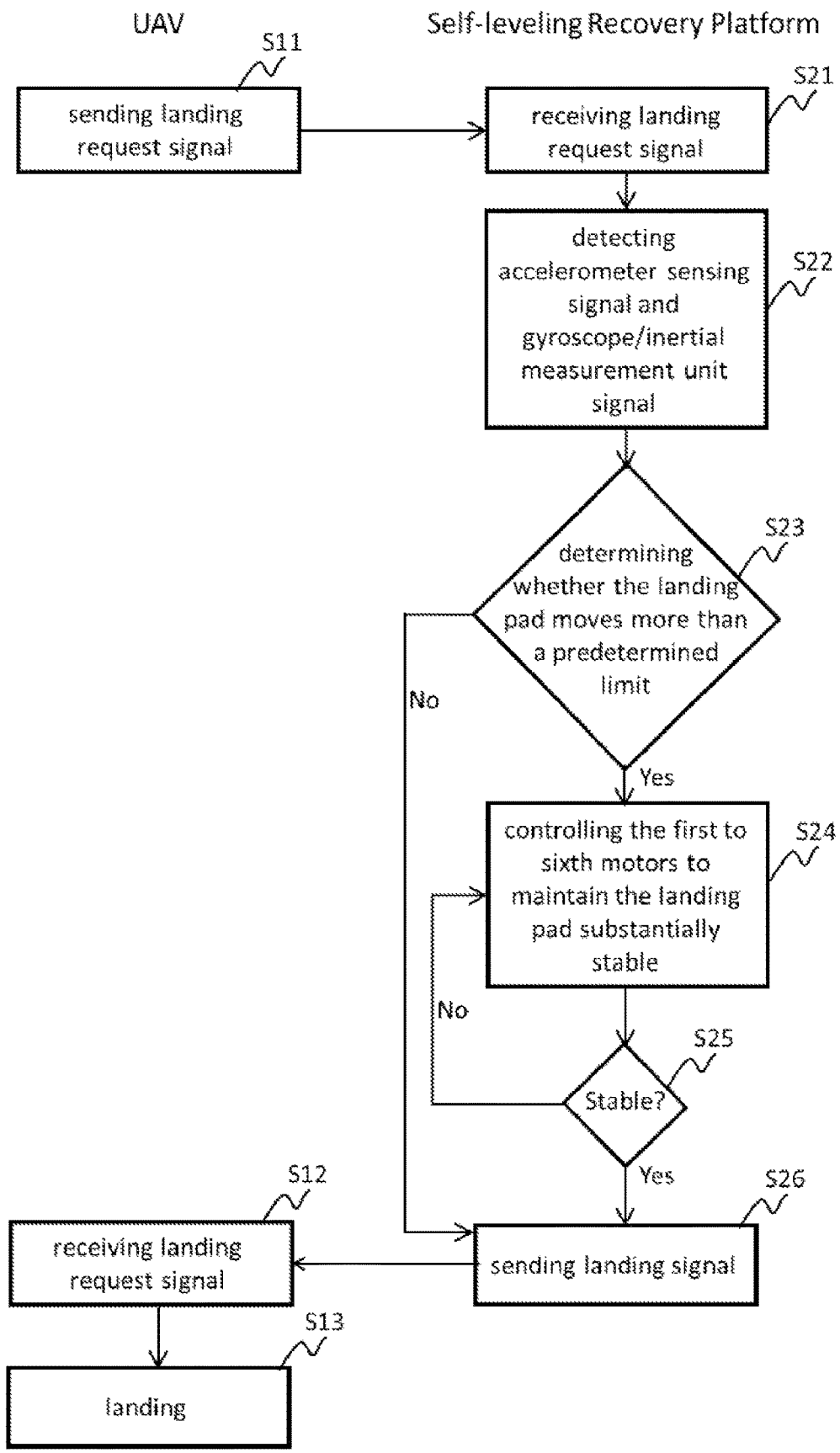
FIG. 3 shows a diagram of a method for landing an unmanned aerial vehicle on a self-leveling recovery platform.

In FIG. 3, a method S100 for landing an unmanned aerial vehicle on a self-leveling recovery platform 100 is follows. The UAV or a person who control the UAV may send a landing request signal to the self-leveling recovery platform 100 S11. Upon receiving the landing request signal from the UAV or the UAV controller, the platform 100 detects sensing signals from the sensor 50 S22. The sensing signals may include an accelerometer sensing signal from the accelerometer and a gyroscope/inertial measurement unit signal from the gyroscope/inertial measurement unit. The platform 100 determines whether the landing pad 40 moves more than a predetermined limit in six degrees of freedom S23. If the landing pad 40 does not move forward/back, up/down, left/right, yaw, pitch, roll more than a predetermined limit, the platform 100 send a landing signal to the UAV 200 or the UAV controller S26. The predetermined limit is determined by the friction force of the UAV 200 or other object on the landing pad 40. If the UAV 200 has wheels, the UAV 200 would be easily movable rather than without wheels. In that case, the predetermined limit would be determined as lower than the limit without wheels. If the landing pad 10 moves more than the predetermined limit, the controller 20 controls the first to sixth motors 30 to control the first to sixth arms 60 such that the first to sixth arms 60 move the landing pad 40 less than the predetermined limit in the six degrees of freedom. Thus, the landing pad 40 is maintained substantially stable for the UAV 200 to land on the platform 100. If the landing pad 49 is stable, the platform 100 send a landing signal and/or a landing pad position information to the UAV 200 or the UAV controller S26. The landing pad position and the landing pad position information may be sent in a regular basis until the unmanned aerial vehicle is landed on the landing pad. The UAV 200 receives the landing signal S12 and lands on the landing pad 40 S13.

It will be apparent to those skilled in the art that various modifications and variations can be made to the disclosed power system without departing from the scope of the disclosure. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

The invention claimed is:

1. A platform for landing an unmanned aerial vehicle, comprising:
a base defining a base plane and configured to fixedly mount to a moving body;
first to sixth motors attached to the base, each of the first to sixth motors connected to a motor projection;
a landing pad defining a landing surface configured to support the unmanned aerial vehicle;
a sensor sensing motion of the landing pad and outputting information to at least one of the first to sixth motors; and
first to sixth arms, each of the first to sixth arms being connected to a motor projection of each of the first to sixth motors, and each of the first to sixth arms being connected to the landing pad,
wherein the connection between each of the first to sixth arms and the projection to which each of the first to sixth arms is connected permits movement between each of the first to sixth arms and the projection to which each of the first to sixth arms is connected;
wherein the connection between each of the first to sixth arms and the landing pad permits movement between each of the first to sixth arms and the landing pad; and
wherein the first to sixth motors
receive information from the sensor,
move the motor projection in the vertical direction, and
maintain the landing pad in a desired orientation.

2. The platform of claim 1, wherein each of the first to sixth motors defines a shaft connected to the projection, the projection extending out-of-plane relative to the base plane.

3. The platform of claim 2, wherein each shaft and projection rotates in clockwise and counterclockwise directions according to the information from the sensor.

4. The platform of claim 3, wherein the landing pad includes three connection pieces mounted to the bottom of the landing pad, and each connection piece has two of the first to sixth arms connected to the connection piece.

5. The platform of claim 1, further comprising:
a controller configured to receive the information from the sensor and control each of the motors to adjust each arm in response to the information from the sensor.

6. The platform of claim 5, wherein the first to sixth motors are first to sixth linear actuators each controlled by the controller, and wherein each of the first to sixth arms extends from or retracts towards its corresponding first to sixth motor according to the sensor signal.

7. The platform of claim 6, wherein the first to sixth arms are arranged in three pairs and the connections between each arm in a pair and the platform are closer together than the connections between each arm in a pair and their motors.

8. The platform of claim 1, wherein the landing pad and the first to sixth motors define a vertical distance therebetween, and the first to sixth arms span the vertical distance between the landing pad and the first to sixth motors.

9. The platform of claim 1, wherein the landing pad includes an extension portion that, when extended, provides additional landing area for the unmanned aerial vehicle.

10. The platform of claim 1, wherein each of the first to six arms are pivotally connected to one of the first to sixth motors and pivotally connected to the landing pad.

11. The platform of claim 2, wherein each shaft defines a rotation axis, and each rotation axis is parallel to the base plane.

12. The platform of claim 1, wherein each of the first to sixth motors defines a shaft connected to the projection, the projection extending out-of-plane relative to the base plane, the platform further comprising:

a controller configured to receive the information from the sensor and control each of the motors to adjust each arm in response to the information from the sensor;

wherein the first to sixth arms are arranged in three pairs and the connections between each arm in a pair and the platform are closer together than the connections between each arm in a pair and their motors;

each shaft and projection rotates in clockwise and counterclockwise directions according to the information from the sensor;

wherein the landing pad and the first to sixth motors define a vertical distance therebetween, and the first to sixth arms span the vertical distance between the landing pad and the first to sixth motors; and the landing pad includes an extension portion that, when extended, provides additional landing area for the unmanned aerial vehicle;

wherein each of the first to six arms are pivotally connected to one of the first to sixth motors and pivotally connected to the landing pad; and wherein each shaft defines a rotation axis, and each rotation axis is parallel to the base plane.

13. A method for manufacturing an unmanned aerial vehicle platform, comprising:

attaching first to sixth motors to a base, the base defining a vertical direction;

connecting a motor projection to each of the first to sixth motors;

pivotally connecting the first to sixth motor projections to first to sixth arms;

pivotally connecting the first to sixth arms to a landing pad;

configuring the connection between each of the first to sixth arms and the motor projection to which each of the first to sixth arms is connected to permit movement between each of the first to sixth arms and the motor projection;

configuring the connection between each of the first to sixth arms and the landing pad to permit movement between each of the first to sixth arms and the landing pad;

connecting a motion sensor to the unmanned aerial vehicle platform, wherein the motion senor is configured to communicate with at least one of the first to sixth motors; and configuring at least one of the first to sixth motors to move the motor projection to which the at least one of the first to sixth motors is connected in the vertical direction in response to the information from the sensor.

14. The method of claim 13, wherein each of the first to sixth motors defines a shaft, wherein the projection extends out-of-plane relative to the base plane and the shaft defining a rotation axis parallel to the base plane, the method further comprising:

mounting three connection pieces to the bottom of the landing pad; and connecting one end of two of the first to sixth arms to each of the three connection pieces.

15. The method of claim 13, wherein the base and the landing pad define a vertical distance therebetween, the method further comprising:

spanning the vertical distance between the landing pad and the base with the first to sixth arms.

16. The method of claim 13, further comprising:

attaching an extension portion to the landing pad that, when extended, provides additional landing area for the unmanned aerial vehicle.

17. A platform for landing an unmanned aerial vehicle, comprising:

a base configured to mount to a moving body;

first to sixth motors connected to the base, each of the first to sixth motors including a motor projection;

a landing pad defining a landing surface configured to support an unmanned aerial vehicle;

a sensor configured to sense the orientation of the landing pad and output information related to the orientation of the landing pad;

first to sixth arms, each of the first to sixth arms defining a first end and a second end, the first end of each of the first to sixth arms connected to a motor projection and the second end of each arm connected to the landing pad;

wherein the connection between each of the first to sixth arms and the motor projection to which each of the first to sixth arms is connected permits movement between each of the first to sixth arms and the motor projection;

wherein the connection between each of the first to sixth arms and the landing pad to which each of the first to sixth arms is connected permits movement between each of the first to sixth arms and the landing pad;

means for maintaining the landing pad in a desired orientation, said means including means for moving the first end of each of the first to six arms in the vertical direction and in response to output information from the sensor.

18. The platform of claim 17, wherein the base defines a base plane and the means for moving the motor attachment location of each of the first to six arms includes a shaft, wherein the projection extends out-of-plane relative to the base plane.

19. The platform of claim 17, wherein the first to sixth arms are arranged in three pairs of adjacent arms, and the connections between each arm in a pair and the platform are closer together than the connections between each arm in a pair and their motors.

20. The platform of claim 17, wherein the landing pad and the first to sixth motors define a vertical distance therebetween, and the first to sixth arms span the vertical distance between the landing pad and the first to sixth motors.

21. The platform of claim 17, wherein the base defines abase plane;

the means for moving the motor attachment location of each of the first to six arms includes a shaft;

each motor projection extends out-of-plane relative to the base plane;

the first to sixth arms are arranged in three pairs of adjacent arms, and the connections between each arm in a pair and the platform are closer together than the connections between each arm in a pair and their motors; and the landing pad and the first to sixth motors define a vertical distance therebetween, aid the first to sixth arms span the vertical distance between the landing pad and the first to sixth motors.

* * * * *